United States Patent
Adamic et al.

(10) Patent No.: US 9,963,607 B2
(45) Date of Patent: May 8, 2018

(54) NON-NEWTONIAN INKJET INKS

(71) Applicant: Hewlett-Packard Development Company, L.P., Fort Collins, CO (US)

(72) Inventors: Raymond Adamic, Corvallis, OR (US); Vladimir Jakubek, Corvallis, OR (US); James P. Shields, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days. days.

(21) Appl. No.: 15/118,977

(22) PCT Filed: Mar. 6, 2014

(86) PCT No.: PCT/US2014/021134
§ 371 (c)(1),
(2) Date: Aug. 15, 2016

(87) PCT Pub. No.: WO2015/134024
PCT Pub. Date: Sep. 11, 2015

(65) Prior Publication Data
US 2017/0051171 A1    Feb. 23, 2017

(51) Int. Cl.
*C09D 11/38*    (2014.01)
*B41J 2/01*    (2006.01)
(Continued)

(52) U.S. Cl.
CPC ............. *C09D 11/38* (2013.01); *B41J 2/01* (2013.01); *B41J 2/04* (2013.01); *B41M 5/0023* (2013.01);
(Continued)

(58) Field of Classification Search
CPC ....... C09D 11/38; C09D 11/34; C09D 11/324; C09D 11/033; C09D 11/40; B41J 2/01; B41J 2/04; B41J 2/2107; B41M 5/0023
See application file for complete search history.

(56) References Cited

U.S. PATENT DOCUMENTS 4,591,612 A    5/1986 Quinn
4,728,578 A    3/1988 Higgins et al.
(Continued)

FOREIGN PATENT DOCUMENTS

JP    2012040760    3/2012
WO    2014127050    8/2014

OTHER PUBLICATIONS

International Search Report dated Dec. 3, 2014 for PCT/US2014/021134, Applicant Hewlett-Packard Development Company, L.P.

*Primary Examiner* — Geoffrey Mruk
(74) *Attorney, Agent, or Firm* — Thorpe, North & Western L.L.P.

(57) ABSTRACT

The present disclosure provides non-Newtonian inkjet inks and related methods. In one example, a non-Newtonian inkjet ink can comprise a low molecular weight organic gelator in an amount ranging from 0.1% to 10% by weight based on the total weight of the non-Newtonian inkjet ink; a salt in an amount of 0.05% to 20% by weight based on the total weight of the non-Newtonian inkjet ink; and an organic solvent. Additionally, the low molecular weight organic gelator and the salt can form a structured network and the inkjet ink can have a viscosity ranging from 100 cps to 10,000 cps at a temperature of 25° C. and a viscosity ranging from 1 cps to 10 cps at a temperature of 50° C.

15 Claims, 2 Drawing Sheets

(51) Int. Cl.
  *B41M 5/00*   (2006.01)
  *B41J 2/04*   (2006.01)
  *C09D 11/033* (2014.01)
  *C09D 11/324* (2014.01)
  *C09D 11/40*  (2014.01)
  *B41J 2/21*   (2006.01)

(52) U.S. Cl.
  CPC .......... *C09D 11/033* (2013.01); *C09D 11/324* (2013.01); *B41J 2/2107* (2013.01); *C09D 11/40* (2013.01)

(56) References Cited

U.S. PATENT DOCUMENTS

| | | |
|---|---|---|
| 7,320,727 B2 | 1/2008 | Jou et al. |
| 8,435,339 B2 | 5/2013 | Koyano et al. |
| 2004/0065227 A1* | 4/2004 | Breton .................. C09D 11/34 106/31.29 |
| 2005/0165135 A1 | 7/2005 | Mozel et al. |
| 2006/0159850 A1 | 7/2006 | Breton et al. |
| 2006/0266259 A1 | 11/2006 | Bedford et al. |
| 2007/0211110 A1* | 9/2007 | Iftime .................. C09D 11/101 347/52 |
| 2007/0279467 A1 | 12/2007 | Regan et al. |
| 2012/0028002 A1 | 2/2012 | Yokoi et al. |
| 2013/0010040 A1 | 1/2013 | Sekiguchi et al. |
| 2013/0141505 A1 | 6/2013 | Ikeda et al. |

\* cited by examiner

NON-NEWTONIAN INKJET INKS

BACKGROUND

The use of ink-jet printing systems has grown dramatically in recent years. This growth may be attributed to substantial improvements in print resolution and overall print quality coupled with appreciable reduction in cost. Today's ink-jet printers offer acceptable print quality for many commercial, business, and household applications at costs much lower than comparable products available just a few years ago. Notwithstanding their recent success, intensive research and development efforts continue toward improving ink-jet print quality, while further lowering cost to the consumer.

An ink-jet image is formed when a precise pattern of dots is ejected from a drop-generating device known as a "printhead" onto a printing medium. Inks normally used in inkjet recording are commonly composed of water-soluble organic solvents (humectants, etc.), surfactants, and colorants in a predominantly aqueous fluid. When a recording is made on "plain paper," the deposited colorants retain some mobility, which can be manifest in poor bleed, edge acuity, feathering, and/or inferior optical density/chroma (due to penetration on the paper). These features adversely impact text and image quality. Some systems include using a coated paper or coating the paper immediately before printing with a coating inkjet ink. Such coatings generally contain various components such as fixers to reduce colorant mobility. However, such systems can be costly, can lower print quality, and can be limiting as the media is typically matched to the inks.

BRIEF DESCRIPTION OF THE DRAWINGS

Additional features and advantages of the disclosure will be apparent from the detailed description which follows, taken in conjunction with the accompanying drawings, which together illustrate, by way of example, features of the technology; and, wherein.

Figure 1:
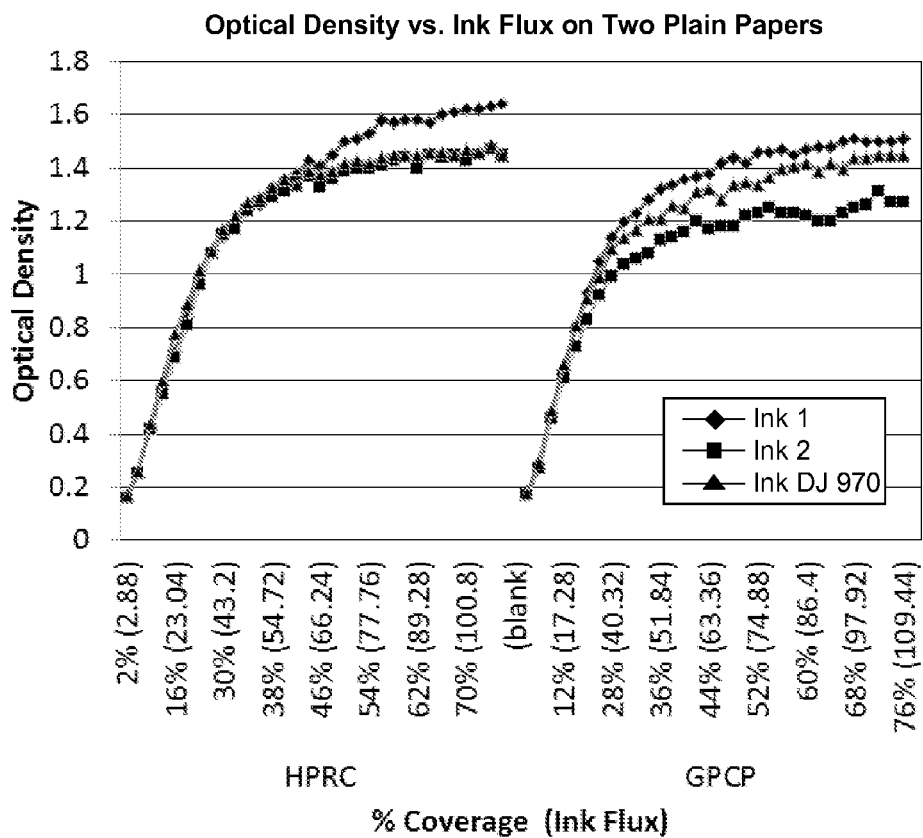
FIG. 1 is a graph of optical density vs. ink flux for non-Newtonian inkjet gel ink, non-gel ink, and a comparative ink in accordance with an example of the present disclosure.

Reference will now be made to the exemplary embodiments illustrated, and specific language will be used herein to describe the same. It will nevertheless be understood that no limitation of the scope of the disclosure is thereby intended.

DETAILED DESCRIPTION

Non-Newtonian inkjet inks can be prepared where the viscosity of the inks can be manipulated by physical forces allowing for printing of the inks via inkjet technologies while achieving superior viscosity upon printing. Notably, the reformation of a structured network after printing can allow for the present non-Newtonian inkjet inks to provide better optical density and other properties than achieved by traditional Newtonian inkjet inks.

Examples in accordance with the present disclosure are directed to non-Newtonian inkjet inks that are useful in standard inkjet printing systems. The present non-Newtonian inkjet inks can be inkjet printed as the viscosity of the non-Newtonian inkjet inks are lowered using thermal control within a printing system, e.g., an thermal inkjet printhead. Once exiting the printhead, the viscosity of the non-Newtonian inkjet inks rapidly increases, e.g. within 30 seconds, via self-assembly of a structured network within the non-Newtonian inkjet inks. Generally, the structured network can be assembled between a low molecular weight organic gelator and salts within the non-Newtonian inkjet inks.

It is noted that when discussing the present compositions and methods, each of these discussions can be considered applicable to each of these embodiments, whether or not they are explicitly discussed in the context of that embodiment. Thus, for example, in discussing a low molecular weight organic gelator used in a non-Newtonian inkjet ink, such a low molecular weight organic gelator can also be used in a method of manufacturing a non-Newtonian inkjet ink and/or a method of printing a non-Newtonian inkjet ink, and vice versa.

It is also noted that when referring to an "ink" or an "inkjet ink," this does not infer that a colorant necessarily be present. Inks, as defined herein, can be colorant free or can alternatively include colorant.

Generally, recording media and/or inkjet inks can have a variety of additives and coatings to provide acceptable quality when used in printing applications. However, in some examples, utilizing the present non-Newtonian inkjet inks may eliminate the need for some layers, may eliminate costly additives, and/or may eliminate the amounts of materials used in certain media sheets/inks.

With the above in mind, a non-Newtonian inkjet ink can comprise a low molecular weight organic gelator in an amount ranging from 0.1% to 10% by weight based on the total weight of the non-Newtonian inkjet ink; a salt in an amount of 0.05% to 20% by weight based on the total weight of the non-Newtonian inkjet ink; and an organic solvent. Additionally, the low molecular weight organic gelator and the salt can form a structured network and the inkjet ink can have a viscosity ranging from 100 cps to 10,000 cps at a temperature of 25° C. and a viscosity ranging from 1 cps to 10 cps at a temperature of 50° C. In one example, the viscosity can be higher than 10,000 cps, such as 20,000 cps, 100,000 cps, or even 500,000 cps at ambient temperature, then significantly decrease with increasing temperature. Notably, the addition of shearing with heating can alter, e.g. lower, the viscosity profiles of the present inks.

As used herein, "structured network" refers to the three dimensional structure formed by the low molecular weight organic gelator and salt via electrostatic interactions and/or physical interactions in non-Newtonian inkjet ink, wherein the three dimensional structure is dependent upon or occurs upon mechanical and/or thermal forces. Such mechanical and/or thermal forces, such as shear energy or heat energy, weaken the structured network such that the viscosity changes based on the amount of force applied, as discussed herein. In one example, the structured network can be free of polymers in that the three dimensional structure does not comprise polymers. However, such an example does not preclude polymers to be present within the non-Newtonian inkjet ink, or even trapped or contained within the structured network. For example, the present non-Newtonian inkjet inks can further comprise a polymeric surfactant as part of the three dimensional structure, (but can be present within such a structure). In another example, the structured network can be a gel.

Regarding the present description as it relates to "non-Newtonian," a non-Newtonian fluid is one in which viscosity changes with changes with an applied force, e.g. thermal, resulting in a viscosity which may not be well-defined. As such, in one aspect, the present non-Newtonian fluids can be thinned by increasing the temperature of the fluids. Typically, in inkjet printing applications, ink is moved between a fluid container and the printhead of an inkjet device. In these applications, the present non-Newtonian inkjet inks can be heated at the fluid container, between the fluid container and the printhead, or in the printhead, thereby decreasing viscosity allowing for inkjet printing followed by rapid cooling and structured network reformation on a recording medium.

In an aspect of these non-Newtonian inkjet inks that is not intuitive to many observers, the colorants, e.g. dispersed pigments which may even be large and dense pigments, show little or no settling in the fluid container or printhead during the times when the ink is not moving through the system or when the ink is not heated. When little or no dynamic pressure is being applied to the ink to move it through the system or when no heat is being applied to the ink, the ink has a viscous consistency. However, when the normal amount of dynamic pressure (~ at least 10,000 Pascals) is applied to the ink to move it through the inkjet system or when the ink is heated to 50° C., the ink viscosity changes to something more resembling pure water, e.g. from 1 to 5 cps.

Thus, when such inks are ejected at a high frequency from the fluid container of an inkjet fluid dispensing device, the dynamic viscosities of the inks are at a low level that does not interfere with the ejection process of the inkjet system. Generally, during the time when the ink is not moving or being heated, settling is either completely prevented or slowed down by several orders of magnitude.

The present structured network can form by pi-pi stacking of aromatic groups present in the low molecular weight organic gelators forming cylindrical fibers. Thus, in one example, as the structures can be essentially planar in their chemical configuration, stacking can occur. The addition of a dissolved salt can shield the repulsive electrostatic charge between the low molecular weight organic gelator species and allow them to interact. Such interaction can include pi-pi aromatic stacking along with hydrogen bonding resulting in fiber formation. Cationic salts can also act to strengthen the fibers or structured network primarily on the recording media. Thus, some treated papers, e.g. ColorLok® papers, which include additional calcium ions, can interact with fibers that form using the low molecular weight organic gelator. Upon heating, the fibers can separate forming discrete domains thereby minimizing interactions between fibers and thereby decreasing viscosity. After sufficient heating, the fibers can be reduced to monomer units of the low molecular weight organic gelators. In the "monomer" form, the viscosity can be expected to be quite low because the size of the structure is much smaller.

Generally, the structured network comprises a low molecular weight organic gelator. As used herein, "low molecular weight organic gelator" refers to an organic molecule or oligomer that is able to form a three dimensional structure with a dissolved salt in the presence of an organic solvent and/or water to form a structured network. As used herein "oligomer" refers to a compound comprised of no more than 10 monomer units. Regarding low molecular weight, in one example, the present low molecular weight organic gelators can have a weight average molecular weight of 50 to 10,000 Mw. In one aspect, the weight average molecular weight can be from 100 to 2,000 Mw.

The present low molecular weight organic gelators can include amino acids, which in some examples can be present in the form of peptides, cyclic peptides, etc. In one example, the amino acids can have a protecting group, e.g., an amine protecting group. In one example, the amino acid can be an aliphatic amino acid such as glycine, alanine, valine, leucine, or isoleucine. In another example, the amino acid can be a hydroxyl or sulfur/selenium-containing amino acid such as serine, cysteine, selenocysteine, threonine, or methionine. In still another example, the amino acid can be a cyclic amino acid such as proline. In yet another example, the amino acid can be an aromatic amino acid such as phenylalanine, tyrosine, or tryptophan. In still another example, the amino acid can be a basic amino acid such as histidine, lysine, or arginine. In still yet another example, the amino acid can be an acidic amino acid or amide-containing amino acid such as aspartate, glutamate, asparagine, or glutamine. Such amino acids can be individually functionalized with the presently disclosed protecting groups or can be combined into peptides, including cyclic peptides, with such functionalization. Regarding the amine protecting groups, in one example, the amine protecting group can be a fluorenyl methoxy carbonyl group. In another example, the amine protecting group can be an aromatic protecting group. Other derivatives can include naphthalene or naphthyl based peptides. In one specific example, the low molecular weight organic gelator can be N-(9-fluorenylmethoxycarbonyl)-L-phenylalanine. In another example, the low molecular weight organic gelator can be a dipeptide of N-(9-fluorenylmethoxycarbonyl)-L-phenylalanine. Other examples include naphthalene derivatives of N-(9-fluorenylmethoxycarbonyl)-L-phenylalanine. Mono and dipeptides of N-(9-fluorenylmethoxycarbonyl) can be obtained from BaChem Chemicals Co.

As discussed herein, the low molecular weight organic gelator can generally be present in the non-Newtonian inkjet ink in an amount ranging from 0.1% to 10% by weight based on the total weight of the non-Newtonian inkjet ink. In one example, the low molecular weight organic gelator can be present in an amount of 1% to 5% by weight, 0.5% to 2% by weight, or in another example, from 0.1% to 5% by weigh, (based on the total weight of the non-Newtonian inkjet ink).

Generally, the structured network comprises a salt, which is typically a dissolved salt. In one example, the salt can be an organic salt. In one aspect, the salt can include salts of carboxylic acids (e.g. sodium or potassium 2-pyrrolidone-5-carboxylic acid), sodium or potassium acetate, salts of citric acid or any organic acid including aromatic salts, and mixtures thereof. In another example, the salt can be an inorganic salt. In one aspect, the salt can be a monovalent salt. Such monovalent salts can include sodium, lithium, potassium cations and nitrate, chloride, acetate anions, and mixtures thereof. In another aspect, the salt can be multivalent, e.g. divalent, and can include calcium nitrate, magnesium nitrate, and mixtures thereof.

As discussed herein, the salt can generally be present in the non-Newtonian inkjet ink in an amount ranging from 0.05% to 20% by weight based on the total weight of the non-Newtonian inkjet ink. In one example, the salt can be present in an amount of 1% to 10% by weight, and in one aspect, 0.5% to 3% by weight; based on the total weight of the non-Newtonian inkjet ink.

The inclusion of a salt, particularly a dissolved salt in gelator ink, can contribute to the structure of the ink. As mentioned, these structured systems show non-Newtonian flow behavior, thus providing useful characteristics for implementation in an ink-jet ink because their ability to shear or thermal thin for jetting. Once jetted, this feature allows the jetted drops to become more elastic-, mass-, or gel-like when they strike the media surface. These characteristics can also provide improved media attributes such as colorant holdout on the surface.

Regarding the inks of the present disclosure (with or without colorant), the role of salt can impact both the jettability and the response after jetting. When comparing two gelator inkjet ink (with or without salt, but otherwise identical), the ink with salt will typically have a lower viscosity over a range of shear rates. In one example, the salt can be added such that its presence in this system is just enough to make an appreciable difference in the printing characteristics of the ink, but not so much that the ink becomes too low in viscosity. This amount can be determined by routine experimentation. For example, the salted gelator ink can be designed so that the ink can refill quickly and produce a higher quality print. Higher quality printing can be determined in one aspect by improved optical density (when a colorant is present in the ink). Typically, inks with salt can have higher optical densities, while retaining good jettability properties and other properties, such as ink structure, rheological behavior, shear thinning, and jetting of ink drops. Furthermore, salt can also contribute to the gelator inks of the present disclosure having decreased restructuring time after shear or thermal thinning for printing. Higher pre-shear rates can often result in a likewise faster response in the presence of salt. In these instances, a fast restructuring of the ink can mean more solid-like behavior on the media surface in less time with less fluid penetration, and thus better colorant holdout and greater ink efficiency.

The properties of the structured network, e.g., viscosity, can be affected by a number of variables including the type of low molecular weight organic gelator, the type of salt, the type of solvents, the amounts of these components, pH, ionic strength, etc. Regarding viscosity, as discussed herein, the viscosity for non-Newtonian fluids are not discrete but change based on the thermal energy applied to the fluid. As used herein, "viscosity" refers to dynamic viscosity unless otherwise stated. For the present inks, the viscosity can generally be measured at two states: proximate in time to a rest state; i.e., at room temperature (about 25° C.), and proximate in time to a processing state; i.e., at an elevated temperature (e.g. 50° C.). Generally, the present inks can have a dynamic viscosity ranging from 100 cps to 10,000 cps at room temperature and a dynamic viscosity ranging from 1 cps to 5 cps at a temperature of 50° C. In one example, the dynamic viscosity can be 100 cps to 1000 cps at room temperature and can be 1 cps to 10 cps at temperature of 50° C. Additionally, in one example, the low molecular weight organic gelator and the salt can be present in a non-Newtonian inkjet ink at a low molecular weight organic gelator to salt ratio ranging from 1:1 to 1:5 by weight. In one aspect, the ratio can be from 0.5:1 to 2:1.

Generally, the present structured network is formed in the presence of organic solvents and water. As used herein, "organic solvent" refers to any organic solvent or mixture thereof. As such, the term organic solvent includes systems of solvents. The present organic solvents are in addition to any water present in the non-Newtonian inkjet ink. Typical organic solvents that can be used include methanol, ethanol, propanol, iso-propanol, a glycol ether having at least about four carbon atoms, C4-8 alcohols, 1-methoxy-2-propanol, 2-methoxy ethanol, 2-ethoxy ethanol, 1-methoxy-2-acetoxy propane, ethyl lactate, a glycol ether (optionally having at least about 10 carbon atoms), a dihydric alcohol (optionally having at least about 2 carbon atoms), tripropylene glycol monomethyl ether, tripropylene glycol-n-butyl ether, propylene glycol phenyl ether, 2-pyrrolidinone (2P), 1-(2-hydroxyethyl)-2-pyrrolidinone (2HE2P), glycerol polyoxyethyl ether (LEG-1), 1,3-Bis(2-Hydroxyethyl)-5,5-Dimethylhydantoin (Dantocol® DHE), 2-methyl-1,3-propanediol (MPdiol), ethylhydroxy-propanediol (EHPD), glycerol, 1,5-pentanediol, 1,2-pentanediol, thiodiglycol, sulfolane, 1,3-dimethyl-2-imidazolidinone, caprolactam, ethylene glycol, diethylene glycol, triethylene glycol, tetraethylene glycol, propylene glycol, dipropylene glycol, tripropylene glycol, trimethylene glycol, butylene glycol, hexylene glycol, polyethylene glycol, polypropylene glycol, glycerol, 1,2,6-hexanetriol, ethylene glycol monomethyl ether, ethylene glycol monoethyl ether, diethylene glycol monomethyl ether, diethylene glycol monoethyl ether, diethylene glycol dimethyl ether, and mixtures thereof.

Additionally, organic solvents can be classified as network participating solvents and network non-participating solvents. As used herein, "network participating solvent" refers to organic solvents that increase viscosity of the non-Newtonian inkjet ink, typically measured at any temperature functional. As used herein, "network non-participating solvent" refers to organic solvents that decrease the viscosity of the non-Newtonian inkjet ink, measured at any functional temperature. As such, the present non-Newtonian inkjet inks can be altered based on the types of organic solvents used. For example, when the non-Newtonian inkjet ink comprises a network participating solvent, the structured network can be strengthened, e.g., the viscosity of the non-Newtonian inkjet ink can be increased. However, when a network non-participating solvent is used, the structured network can be weakened, e.g., the viscosity of the non-Newtonian inkjet ink can be decreased. In one example, network participating solvents can include ethylhydroxy-propanediol (EHPD), glycerol, 1,5 pentanediol, ethylene glycol, triethylene glycol, and mixtures thereof. In another example, network non-participating solvents can include 2-pyrrolidinone, 1,2 pentanediol, MPDIOL, 1,2 hexanediol, and mixtures thereof. As such, the structured network properties and resultant non-Newtonian inkjet ink properties can be modified by mixing and matching particular organic solvents. In one example, the organic solvent comprises a mixture of a network participating solvent and a network non-participating solvent. Additionally, the present inks can contain a significant amount of organic solvent, including network participating solvents and/or network non-participating solvents. In one example, the organic solvent can be present in an amount ranging from 5% to 50% by weight based on the total weight of the non-Newtonian inkjet ink. In one aspect, the organic solvent can be present in an amount ranging from 10% to 40%, or even, 15% to 30% by weight.

As discussed herein, the present non-Newtonian inkjet inks can provide excellent optical density independent of the media used. For example, FIG. 1 provides a graph of optical density vs. ink flux for a non-Newtonian gel ink, a non-Newtonian ink that does not gel, and a comparative ink. As shown in FIG. 1, the present inks have improved optical density as provided by Ink 1, which is a gel-based ink and sensitive to temperature. Ink 2 is the non-gel based version of Ink 1 with poor optical density. Thus, the non-Newtonian gel-based character of Ink 1 shows more propensity to gel or restructure on the media surface as the ink cools compared to its non-gel counterpart. Furthermore, the ink efficiency measured as optical density obtained per mass of ink colorant on the media of Ink 1 is superior to the comparative ink, commercially available Ink Cartridge DJ970, even though it appears similar on the curve, because the carbon black loading of Ink 1 is ~30% less than the comparative ink. Thus, Ink 1 has comparable or better ink efficiency on the papers than the Ink HP DJ970 cartridge.

In accordance with this, in one example, the optical density of the non-Newtonian inkjet ink can be increased by at least 5% over a comparative inkjet ink printed from the same inkjet printer on the same recording media with the same print coverage. In other aspects, the optical density can be increased by 10%, 15%, 20%, or 30%. Such recording media can include both coated and uncoated recording media. As used herein, "comparative inkjet ink" refers to an aqueous Newtonian inkjet ink such as that available commercially in the HP DJ970 Black ink cartridge.

As discussed herein, the present inks can include a colorant. Such colorants can be pigments and/or dyes. In one example, the colorant is a pigment, and in one aspect, a dispersed pigment. Pigments can be any dispersed colorant generally used in the ink jet arts, including, but not limited to self-dispersed pigments that are dispersed by either small molecules or polymers, etc., or dispersing agent dispersed pigments that are dispersed by the addition of a separate dispersing agent, e.g. a polymeric dispersing agent. In other examples, the colorant can be a dye, including one or more of the many water soluble dyes that are typically used in the inkjet arts. Examples include direct dyes, vat dyes, sulphur dyes, organic dyes, reactive dyes, disperse dyes, acid dyes, azoic dyes, or basic dyes. In yet another example, the colorant can be a mixture of a pigment and a dye.

The present inks can be used in conjunction with multiple imaging systems, non-limiting examples of which include thermal or piezo inkjet, dye-sub, thermal transfer, electrostatic, liquid electrophotographic printing (LEP), etc. Additionally, the present inks can include water, and can further include non-ionic, cationic, and/or anionic surfactants, ranging from 0.001% to 10% by weight. The present formulations can include other components, such as biocides, viscosity modifiers, materials for pH adjustment, sequestering agents, preservatives, and the like.

Figure 2:
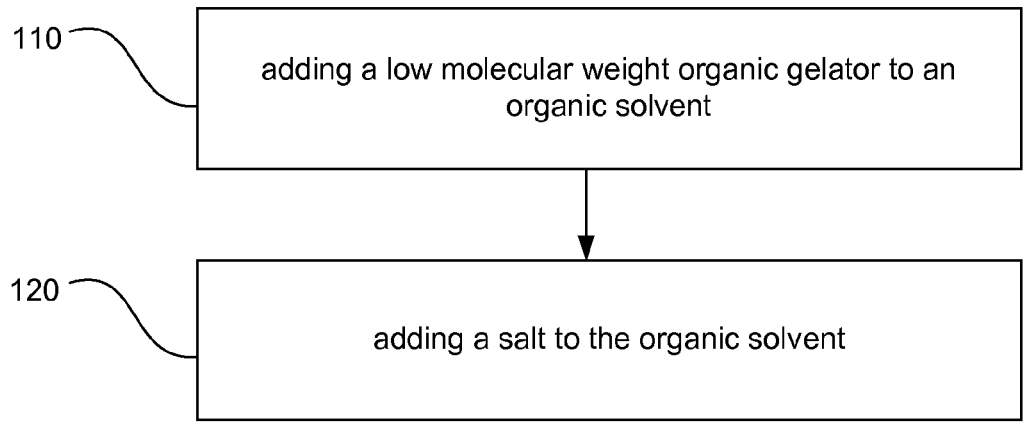
FIG. 2 is a flow chart of a method in accordance with an example of the present disclosure.

In addition to the non-Newtonian inkjet inks described herein, the present disclosure provides for methods relating thereto. Turning now to FIG. 2, a method of manufacturing a non-Newtonian inkjet ink, can comprise adding 110 a low molecular weight organic gelator to an organic solvent; and adding a salt to the organic solvent 120. The low molecular weight organic gelator and the salt can be present in the organic solvent at an amount sufficient to form a structured network and provide a dynamic viscosity ranging from 100 cps to 10,000 cps at a temperature of 25° C. and a dynamic viscosity ranging from 1 cps to 10 cps at a temperature of 50° C.

The present method can further comprise mixing a colorant into the non-Newtonian gel-based inkjet inks. In one example, the colorant can be a pigment. As discussed herein, such pigments can be self-dispersed or can further include dispersants, e.g., a polymer dispersant. In one example, commercially available colloidal metal oxide dispersions of particle sizes from 10 to 50 nm, such as silica and alumina, can be received from companies such as Nissan Chemical American Corporation and US Research Nanomaterials, Inc, among others.

Figure 3:
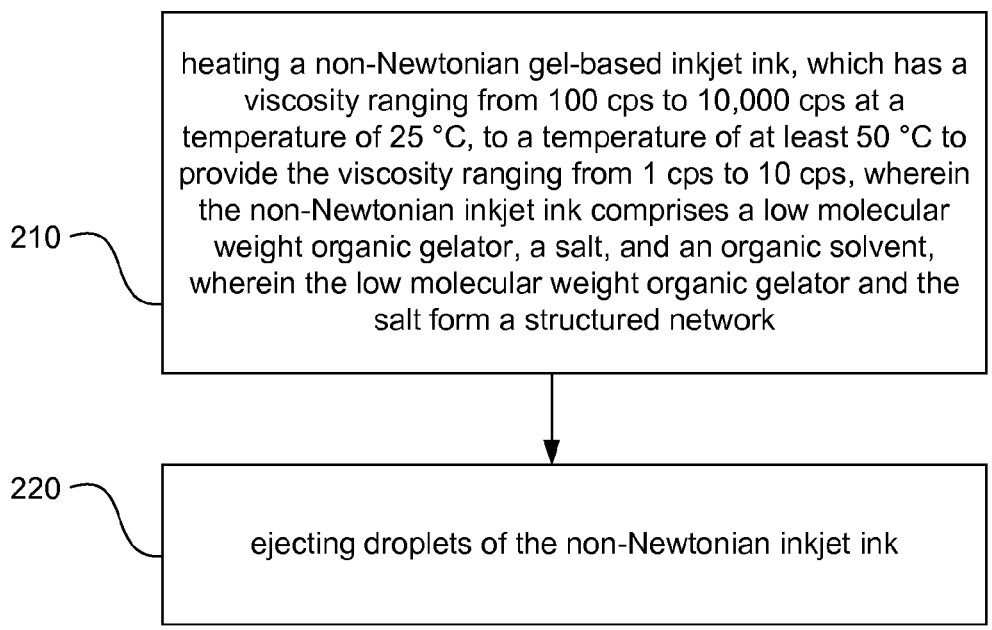
FIG. 3 is a flow chart of a method in accordance with an example of the present disclosure.

Turning now to FIG. 3, a method of printing a non-Newtonian inkjet ink can comprise heating 210 a non-Newtonian gel-based inkjet ink (which has a viscosity ranging from 100 cps to 10,000 cps at a temperature of 25° C.) to a temperature of at least 50° C. to provide the viscosity ranging from 1 cps to 10 cps. The non-Newtonian inkjet ink comprises a low molecular weight organic gelator, a salt, and an organic solvent, and the low molecular weight organic gelator and the salt form a structured network, and in some examples, the organic solvent can participate in forming the network. An additional step includes ejecting 220 droplets of the non-Newtonian inkjet ink.

Regarding the present method steps, such steps can be performed in a number of sequences and are not intended to be limited to the order written. For example, the adding of the low molecular weight organic gelator can be before adding the salt, and vice versa. Additionally, it is noted that any and all combinations of such steps or individual step may be performed sequentially or simultaneously. For example, adding the low molecular weight organic gelator and adding the salt may be performed sequentially or may be performed simultaneously.

Additionally, it is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is be noted that, as used in this specification and the appended claims, the singular forms "a," "an," and "the" include plural referents unless the context clearly dictates otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

EXAMPLES

The following examples illustrate some embodiments of the present inks and methods that are presently known. However, it is to be understood that the following are only exemplary or illustrative of the application of the principles of the present inks and methods. Numerous modifications and alternative examples may be devised by those skilled in the art without departing from the spirit and scope of the present compositions and methods. The appended claims are intended to cover such modifications and arrangements. Thus, while the present inks and methods have been described above with particularity, the following examples provide further detail in connection with what are presently deemed to be the acceptable embodiments.

Example 1

Non-Newtonian Inkjet Inks

Two non-Newtonian type gel-based inkjet inks were prepared with the components and the amounts listed in Table 1. As one note, Ink 2 has more non-network participating solvent (as discussed above) than Ink 1, and thus is much less gel-like in character in nature as compared to Ink 1.

TABLE 1

| Components | Ink 1 (% by weight) | Ink 2 (% by weight) |
|---|---|---|
| FMOC-PHE* | 1 | 1 |
| 2-pyrrolidone-5-carboxylic acid | 2.5 | 1.5 |
| EHPD + 2 pyrrolidinone | 12.5 | 20 |
| Dispersed Carbon Black** | 2.5 | 2.5 |
| Water | Balance | Balance |
| pH | 9 | 9 |

*FMOC-PHE is N-(9-fluorenylmethoxycarbonyl)-L-phenylalanine
**Cab-O-Jet 300 Series K as obtained from Cabot Jet Corporation Example 2

Viscosity vs. Shear Rate

The viscosities of the non-Newtonian inkjet inks of Example 1 were measured on a CAP2000 rheometer from Brookfield Instruments for varying shear rates at 25° C. as reported in Table 2, at 35° C. as reported in Table 3, and at 50° C. as reported in Table 4. Ink 1 viscosities at 25° C. and 35° C. have more structure and thus non-Newtonian behavior compared to Ink 2 viscosities. As the temperature is increased to 50° C. (or greater), they become comparable in viscosity behavior. This difference is noted when printed on paper and the optical density is measured as a function of ink flux.

TABLE 2

| Shear Rate ($s^{-1}$) at 25° C. | Viscosity 1 (cps) | Viscosity 2 (cps) |
|---|---|---|
| 133 | 733 | 14.8 |
| 667 | 56.9 | 6.7 |
| 1333 | 9.1 | 4.9 |
| 5333 | 3.6 | 4.1 |
| 10667 | 3.1 | 3.8 |

TABLE 3

| Shear Rate ($s^{-1}$) at 35° C. | Viscosity 1 (cps) | Viscosity 2 (cps) |
|---|---|---|
| 133 | 86.6 | 9 |
| 667 | 13.6 | 5.7 |
| 1333 | 8 | 4.3 |
| 5333 | 4.9 | 3.2 |
| 10667 | 4.7 | 3.2 |

TABLE 4

| Shear Rate ($s^{-1}$) at 50° C. | Viscosity 1 (cps) | Viscosity 2 (cps) |
|---|---|---|
| 133 | 9 | 9 |
| 667 | 4.4 | 5.9 |
| 1333 | 2.1 | 4 |
| 5333 | 1.3 | 2.8 |
| 10667 | 1.6 | 2.4 |

Example 3

Optical Density vs. Paper and Print Density

Various recording media were printed at varying printing densities using the non-Newtonian inkjet inks of Example 1 and a comparative Newtonian inkjet ink, HP® 970 black ink, with the optical density values as reported in Tables 5, 6, and 7, respectively. The optical densities were measured using Gretag Macbeth® Spectrolino densitometer. Printing was performed at various percentages (%) at 1200×1200 dpi and various ink flux (ng/300 dpi).

TABLE 5

| Ink 1 | | | | | |
|---|---|---|---|---|---|
| Coverage (%) | Ink Flux (ng/300 dpi) | HPMP (OD) | HPRC (OD) | STAPLES (OD) | GPCP (OD) |
| 2 | 2.88 | 0.15 | 0.17 | 0.18 | 0.17 |
| 4 | 5.76 | 0.26 | 0.26 | 0.3 | 0.29 |
| 8 | 11.52 | 0.44 | 0.43 | 0.51 | 0.48 |
| 12 | 17.28 | 0.59 | 0.58 | 0.7 | 0.64 |
| 16 | 23.04 | 0.74 | 0.71 | 0.85 | 0.81 |
| 20 | 28.8 | 0.87 | 0.84 | 0.95 | 0.93 |
| 24 | 34.56 | 0.99 | 1 | 1.05 | 1.05 |
| 28 | 40.32 | 1.08 | 1.09 | 1.1 | 1.14 |
| 30 | 43.2 | 1.14 | 1.14 | 1.11 | 1.20 |
| 32 | 46.08 | 1.21 | 1.2 | 1.14 | 1.23 |
| 34 | 48.96 | 1.25 | 1.25 | 1.18 | 1.28 |
| 36 | 51.84 | 1.32 | 1.26 | 1.21 | 1.32 |
| 38 | 54.72 | 1.33 | 1.33 | 1.2 | 1.34 |
| 40 | 57.6 | 1.38 | 1.36 | 1.22 | 1.36 |
| 42 | 60.48 | 1.41 | 1.38 | 1.25 | 1.37 |
| 44 | 63.36 | 1.44 | 1.43 | 1.25 | 1.38 |
| 46 | 66.24 | 1.42 | 1.41 | 1.22 | 1.42 |
| 48 | 69.12 | 1.48 | 1.45 | 1.21 | 1.4 |
| 50 | 72 | 1.51 | 1.5 | 1.21 | 1.42 |
| 52 | 74.88 | 1.54 | 1.51 | 1.28 | 1.46 |
| 54 | 77.76 | 1.51 | 1.53 | 1.28 | 1.46 |
| 56 | 80.64 | 1.55 | 1.58 | 1.26 | 1.47 |
| 58 | 83.52 | 1.58 | 1.57 | 1.28 | 1.46 |
| 60 | 86.4 | 1.58 | 1.58 | 1.22 | 1.47 |
| 62 | 89.28 | 1.57 | 1.58 | 1.23 | 1.48 |
| 64 | 92.16 | 1.58 | 1.57 | 1.26 | 1.48 |
| 66 | 95.04 | 1.59 | 1.6 | 1.27 | 1.5 |
| 68 | 97.92 | 1.6 | 1.61 | 1.28 | 1.51 |
| 70 | 100.8 | 1.61 | 1.62 | 1.3 | 1.50 |
| 72 | 103.68 | 1.62 | 1.62 | 1.3 | 1.50 |
| 74 | 106.56 | 1.63 | 1.63 | 1.31 | 1.50 |
| 76 | 109.44 | 1.59 | 1.64 | 1.31 | 1.51 |

HPMP—HP® Multipurpose Paper -ColorLok® (International Paper Company)
HPRC—HP® Recycled ColorLok® (International Paper Company)
STAPLES—Staples Copy Paper (Made for Staples)
GPCP—GEORGIA PACIFIC COPY PAPER (Georgia Pacific)
All are 20 lb papers

TABLE 6

| Ink 2 | | | | | |
|---|---|---|---|---|---|
| Coverage (%) | Ink Flux (ng/300 dpi) | HPMP (OD) | HPRC (OD) | STAPLES (OD) | GPCP (OD) |
| 2 | 2.88 | 0.15 | 0.16 | 0.16 | 0.17 |
| 4 | 5.76 | 0.24 | 0.25 | 0.26 | 0.27 |
| 8 | 11.52 | 0.42 | 0.42 | 0.42 | 0.46 |
| 12 | 17.28 | 0.57 | 0.55 | 0.56 | 0.61 |
| 16 | 23.04 | 0.7 | 0.69 | 0.67 | 0.73 |
| 20 | 28.8 | 0.82 | 0.81 | 0.77 | 0.83 |
| 24 | 34.56 | 0.93 | 0.96 | 0.83 | 0.92 |
| 28 | 40.32 | 1.02 | 1.08 | 0.88 | 0.99 |
| 30 | 43.2 | 1.09 | 1.15 | 0.92 | 1.04 |
| 32 | 46.08 | 1.12 | 1.17 | 0.92 | 1.06 |
| 34 | 48.96 | 1.16 | 1.24 | 0.95 | 1.08 |
| 36 | 51.84 | 1.18 | 1.27 | 0.95 | 1.13 |

TABLE 6-continued

Ink 2

| Coverage (%) | Ink Flux (ng/300 dpi) | HPMP (OD) | HPRC (OD) | STAPLES (OD) | GPCP (OD) |
|---|---|---|---|---|---|
| 38 | 54.72 | 1.2 | 1.29 | 0.97 | 1.14 |
| 40 | 57.6 | 1.26 | 1.31 | 0.98 | 1.16 |
| 42 | 60.48 | 1.25 | 1.35 | 0.97 | 1.2 |
| 44 | 63.36 | 1.27 | 1.37 | 0.99 | 1.17 |
| 46 | 66.24 | 1.29 | 1.33 | 0.99 | 1.18 |
| 48 | 69.12 | 1.31 | 1.36 | 1.02 | 1.18 |
| 50 | 72 | 1.35 | 1.39 | 1.02 | 1.22 |
| 52 | 74.88 | 1.34 | 1.4 | 1.01 | 1.23 |
| 54 | 77.76 | 1.37 | 1.4 | 1 | 1.25 |
| 56 | 80.64 | 1.37 | 1.41 | 1.04 | 1.23 |
| 58 | 83.52 | 1.4 | 1.43 | 1.06 | 1.23 |
| 60 | 86.4 | 1.41 | 1.44 | 0.99 | 1.22 |
| 62 | 89.28 | 1.41 | 1.4 | 1.03 | 1.2 |
| 64 | 92.16 | 1.42 | 1.45 | 1.02 | 1.2 |
| 66 | 95.04 | 1.44 | 1.44 | 1.03 | 1.23 |
| 68 | 97.92 | 1.43 | 1.45 | 1.02 | 1.25 |
| 70 | 100.8 | 1.42 | 1.43 | 1.05 | 1.26 |
| 72 | 103.68 | 1.42 | 1.45 | 1.06 | 1.31 |
| 74 | 106.56 | 1.43 | 1.47 | 1.04 | 1.27 |
| 76 | 109.44 | 1.45 | 1.45 | 1.05 | 1.27 |

HPMP—HP ® Multipurpose Paper -ColorLok ® (International Paper Company)
HPRC—HP ® Recycled ColorLok ® (International Paper Company)
STAPLES—Staples Copy Paper (Made for Staples)
GPCP—GEORGIA PACIFIC COPY PAPER (Georgia Pacific)
All are 20 lb papers

TABLE 7

Comparative Ink

| Coverage (%) | Ink Flux (ng/300 dpi) | HPMP (OD) | HPRC (OD) | STAPLES (OD) | GPCP (OD) |
|---|---|---|---|---|---|
| 2 | 2.88 | 0.18 | 0.17 | 0.18 | 0.17 |
| 4 | 5.76 | 0.3 | 0.26 | 0.29 | 0.28 |
| 8 | 11.52 | 0.49 | 0.44 | 0.49 | 0.48 |
| 12 | 17.28 | 0.67 | 0.6 | 0.66 | 0.66 |
| 16 | 23.04 | 0.81 | 0.78 | 0.81 | 0.83 |
| 20 | 28.8 | 0.91 | 0.89 | 0.91 | 0.97 |
| 24 | 34.56 | 1.02 | 1.02 | 0.99 | 1.09 |
| 28 | 40.32 | 1.06 | 1.09 | 1.1 | 1.16 |
| 30 | 43.2 | 1.07 | 1.17 | 1.14 | 1.25 |
| 32 | 46.06 | 1.11 | 1.22 | 1.17 | 1.29 |
| 34 | 48.96 | 1.12 | 1.27 | 1.21 | 1.34 |
| 36 | 51.84 | 1.16 | 1.29 | 1.21 | 1.38 |
| 38 | 54.73 | 1.18 | 1.33 | 1.26 | 1.36 |
| 40 | 57.6 | 1.19 | 1.36 | 1.25 | 1.4 |
| 42 | 60.48 | 1.19 | 1.34 | 1.31 | 1.42 |
| 44 | 63.36 | 1.24 | 1.39 | 1.32 | 1.45 |
| 46 | 66.24 | 1.19 | 1.38 | 1.28 | 1.44 |
| 48 | 69.12 | 1.22 | 1.39 | 1.34 | 1.45 |
| 50 | 72 | 1.24 | 1.42 | 1.35 | 1.48 |
| 52 | 74.88 | 1.27 | 1.43 | 1.34 | 1.48 |
| 54 | 77.76 | 1.23 | 1.42 | 1.37 | 1.47 |
| 56 | 80.64 | 1.3 | 1.44 | 1.4 | 1.48 |
| 58 | 83.52 | 1.31 | 1.45 | 1.41 | 1.5 |
| 60 | 86.4 | 1.27 | 1.45 | 1.42 | 1.5 |
| 62 | 89.28 | 1.3 | 1.45 | 1.39 | 1.47 |
| 64 | 92.16 | 1.3 | 1.46 | 1.42 | 1.48 |
| 66 | 95.04 | 1.27 | 1.46 | 1.4 | 1.49 |
| 68 | 97.92 | 1.34 | 1.45 | 1.44 | 1.48 |
| 70 | 100.08 | 1.34 | 1.47 | 1.44 | 1.48 |
| 72 | 103.68 | 1.33 | 1.46 | 1.45 | 1.48 |
| 74 | 106.5 | 1.36 | 1.49 | 1.45 | 1.47 |
| 76 | 109.4 | 1.35 | 1.45 | 1.45 | 1.5 |

HPMP—HP ® Multipurpose Paper -ColorLok ® (International Paper Company)
HPRC—HP ® Recycled ColorLok ® (International Paper Company)
STAPLES—Staples Copy Paper (Made for Staples)
GPCP—GEORGIA PACIFIC COPY PAPER (Georgia Pacific)
All are 20 lb papers As can be seen from Tables 5, 6, and 7, and as noted in the earlier discussion, the ink efficiency as measured in terms of optical density (OD) provided by mass of ink or colorant is highest with Ink 1. Ink 1 has greater ink structure or characteristics compared to Ink 2 at 25° C. and 35° C. As the ink cools on the media surface, a higher degree of structure is formed and the optical density is greater in intensity. This is especially evident when printing on the GPCP paper or non-color paper. Ink 1 is also more efficient versus the comparative ink due to the higher OD obtained with about 30% less colorant loading. Such optical density performance was independent of paper type; i.e., the OD improvement can be seen on treated (HP Recycled, Color-Lok®) and untreated paper (GPCP).

While the disclosure has been described with reference to certain embodiments, those skilled in the art will appreciate that various modifications, changes, omissions, and substitutions can be made without departing from the spirit of the disclosure. It is intended, therefore, that the present disclosure be limited only by the scope of the following claims.

What is claimed is:

1. A non-Newtonian inkjet ink, comprising:
   a low molecular weight organic gelator in an amount ranging from 0.1% to 10% by weight based on the total weight of the non-Newtonian inkjet ink;
   a salt in an amount of 0.05% to 20% by weight based on the total weight of the non-Newtonian inkjet ink; and
   an organic solvent;
   wherein the low molecular weight organic gelator and the salt form a structured network, and wherein the inkjet ink has a viscosity ranging from 100 cps to 10,000 cps at a temperature of 25 ° C. and a viscosity ranging from 1 cps to 10 cps at a temperature of 50 ° C.

2. The non-Newtonian inkjet ink of claim 1, wherein the low molecular weight organic gelator is selected from the group consisting of amino acids, peptides, cyclic peptides, amino acids having a protecting group, peptides having a protecting group, cyclic peptides having a protecting group, and mixtures thereof.

3. The non-Newtonian inkjet ink of claim 1, wherein the salt is a salt of a carboxylic acid.

4. The non-Newtonian inkjet ink of claim 1, wherein the structured network is free of polymer.

5. The non-Newtonian inkjet ink of claim 1, wherein the organic solvent is network participating solvent selected from the group consisting of ethylhydroxy-propanediol (EHPD), glycerol, 1,5 pentanediol, ethylene glycol, triethylene glycol, and mixtures thereof; or the organic solvent is a network non-participating solvent selected from the group consisting of 2-pyrrolidinone, 1,2 pentanediol, 2-methyl-1, 3-propanediol (MPDIOL), 1,2 hexanediol, and mixtures thereof.

6. The non-Newtonian inkjet ink of claim 1, wherein the organic solvent comprises only a network participating solvent, or a mixture of network participating solvent and network non-participating solvent.

7. The non-Newtonian inkjet ink of claim 1, wherein the low molecular weight organic gelator is present in an amount ranging from 1% to 5% by weight based on the total weight of the non-Newtonian inkjet ink, and the salt is present in an amount ranging from 1% to 10% by weight based on the total weight of the non-Newtonian inkjet ink.

8. The non-Newtonian inkjet ink of claim 1, wherein the organic solvent is present in an amount ranging from 5% to 50% by weight based on the total weight of the non-Newtonian gel-based inkjet ink.

9. The non-Newtonian inkjet ink of claim 1, wherein the low molecular weight organic gelator and the salt are present at a low molecular weight organic gelator to salt ratio ranging from 1:1 to 1:5 by weight.

10. The non-Newtonian inkjet ink of claim 1, further comprising a colorant.

11. The non-Newtonian gel-based inkjet ink of claim 1, wherein the viscosity is 100 cps to 1000 cps at a temperature of 25 ° C. and is 1 cps to 5 cps at a temperature of 50 ° C.

12. A method of manufacturing a non-Newtonian inkjet ink, comprising:
adding a low molecular weight organic gelator to an organic solvent; and
adding a salt to the organic solvent,
wherein the low molecular weight organic gelator and the salt are present in the organic solvent at an amount sufficient to form a structured network and provide a dynamic viscosity ranging from 100 cps to 10,000 cps at a temperature of 25 ° C. and a dynamic viscosity ranging from 1 cps to 10 cps at a temperature of 50 ° C.

13. The method of claim 12, wherein the low molecular weight organic gelator is present in an amount ranging from 0.1% to 10% by weight based on the total weight of the non-Newtonian gel-based inkjet ink; the salt is present in an amount of 0.05% to 20% by weight based on the total weight of the non-Newtonian gel-based inkjet ink; and the organic solvent is present in an amount ranging from 5% to 50% by weight based on the total weight of the non-Newtonian gel-based inkjet ink.

14. The method of claim 12, further comprising mixing a colorant into the non-Newtonian inkjet ink.

15. A method of printing a non-Newtonian inkjet ink, comprising:
heating a non-Newtonian gel-based inkjet ink, which has a viscosity ranging from 100 cps to 10,000 cps at a temperature of 25 ° C., to a temperature of at least 50 ° C. to provide the viscosity ranging from 1 cps to 10 cps, wherein the non-Newtonian inkjet ink comprises a low molecular weight organic gelator, a salt, and an organic solvent, wherein the low molecular weight organic gelator and the salt form a structured network; and
ejecting droplets of the non-Newtonian inkjet ink.

* * * * *

UNITED STATES PATENT AND TRADEMARK OFFICE
CERTIFICATE OF CORRECTION

PATENT NO. : 9,963,607 B2
APPLICATION NO. : 15/118977
DATED : May 8, 2018
INVENTOR(S) : Raymond Adamic et al.

It is certified that error appears in the above-identified patent and that said Letters Patent is hereby corrected as shown below:

In the Claims

In Column 12, Lines 46-47, Claim 5, delete "tritethylene" and insert -- triethylene --, therefor.

Signed and Sealed this
Sixth Day of November, 2018

Andrei Iancu
*Director of the United States Patent and Trademark Office*